United States Patent
Macaudiere et al.

[11] Patent Number: 5,474,695
[45] Date of Patent: Dec. 12, 1995

[54] MIXTURES OF 1,1,1-TRIFLUOROETHANE, PERFLUOROPROPANE AND PROPANE, AND THEIR APPLICATIONS AS REFRIGERANT FLUIDS, AS AEROSOL PROPELLANTS OR AS BLOWING AGENTS FOR PLASTIC FOAMS

[75] Inventors: Sylvie Macaudiere, Asnieres; Jean-Claude Tanguy, Sannois, both of France

[73] Assignee: d'Elf Atochem S.A., Puteaux, France

[21] Appl. No.: 363,549

[22] Filed: Dec. 23, 1994

Related U.S. Application Data

[63] Continuation of Ser. No. 65,039, Oct. 8, 1992, abandoned.

[30] Foreign Application Priority Data

Oct. 9, 1991 [FR] France ................... 91 12439

[51] Int. Cl.$^6$ .................. C09K 5/04; C09K 3/30; C08J 9/14; C11D 7/50
[52] U.S. Cl. .................. 252/67; 62/114; 252/162; 252/172; 252/305; 252/364; 252/DIG. 9; 264/53; 264/DIG. 5; 521/98; 521/131
[58] Field of Search .................. 252/67, 162, 172, 252/305, 364, DIG. 9; 264/53, DIG. 5; 521/98, 131; 62/114

[56] References Cited

U.S. PATENT DOCUMENTS

| | | | |
|---|---|---|---|
| 4,085,073 | 4/1978 | Suh et al. | 264/50 |
| 4,174,295 | 11/1979 | Bargigia et al. | 252/305 |
| 4,482,465 | 11/1984 | Gray | 252/67 |
| 4,923,626 | 5/1990 | Tamura et al. | 252/67 |
| 4,957,652 | 9/1990 | Tamura et al. | 252/67 |
| 5,035,823 | 7/1991 | Tamura et al. | 252/67 |
| 5,080,823 | 1/1992 | Arnaud et al. | 252/172 |
| 5,087,381 | 2/1992 | Tamura et al. | 252/67 |
| 5,108,637 | 4/1992 | Pearson | 252/67 |
| 5,135,054 | 8/1992 | Nimitz et al. | 252/8 |
| 5,234,613 | 8/1993 | Shiflett | 252/67 |
| 5,236,611 | 8/1993 | Shiflett | 252/67 |

FOREIGN PATENT DOCUMENTS

| | | |
|---|---|---|
| 0419042 | 3/1991 | European Pat. Off. . |
| 0427604A1 | 5/1991 | European Pat. Off. . |
| 0430170A1 | 6/1991 | European Pat. Off. . |
| 1542023 | 9/1968 | France . |
| 63-105088 | 5/1988 | Japan . |
| 3-093889 | 4/1991 | Japan . |
| 92/01762 | 2/1992 | WIPO . |
| 92/16597 | 10/1992 | WIPO . |

OTHER PUBLICATIONS

Derwent Abstract of Japanese Kokai Pub. No. 3–93889, Apr. 1991.
Derwent Abstract of Japanese Kokai Pub. No. 63–105088, May 1988.

*Primary Examiner*—Linda Skaling Therkorn
*Attorney, Agent, or Firm*—Morgan & Finnegan

[57] ABSTRACT

To replace chlorofluorocarbons as refrigerant fluids, the invention proposes to employ mixtures containing, on a mass basis, approximately 25 to 65% of 1,1,1-trifluoroethane, 1 to 70% of perfluoropropane and 5 to 34% of propane.

The mixtures according to the invention can also be employed as aerosol propellants or as blowing agents for plastic foams.

5 Claims, No Drawings

MIXTURES OF 1,1,1-TRIFLUOROETHANE, PERFLUOROPROPANE AND PROPANE, AND THEIR APPLICATIONS AS REFRIGERANT FLUIDS, AS AEROSOL PROPELLANTS OR AS BLOWING AGENTS FOR PLASTIC FOAMS

This is a continuation of application Ser. No. 08/065,039, filed on Oct. 8, 1992 now abandoned.

FIELD OF THE INVENTION

The present invention relates to mixtures of refrigerant fluids with a low boiling point, which have no or little effect on the environment and are intended to replace chlorofluorocarbons (CFCs) in low-temperature compression refrigeration systems.

BACKGROUND OF THE INVENTION

It has now been established that because of their high coefficient of effect on ozone, CFCs will, in the long or medium term, be replaced by refrigerant fluids which no longer contain chlorine and are consequently less aggressive towards the environment.

When compared with completely halogenated compounds, 1,1,1-trifluoroethane (HFA 143a), perfluoropropane (HFA 218) and propane (R 290) have a very weak effect on the environment. However, their use in refrigeration results in a relatively low refrigerating power, a high compression ratio and, consequently, high operating costs.

DETAILED DESCRIPTION OF THE INVENTION

It has now been found that mixtures containing, on a mass basis, approximately 25 to 65% of HFA 143a, 1 to 70% of HFA 218 and 5 to 34% of R 290 exhibit a considerably higher refrigerant power with lower compression ratios, when compared with the individual constituents.

It has also been found that the three constituents together form an azeotrope with a minimum boiling point of approximately −54.7° C. at 1.013 bar, whose HFA 218 content at the normal boiling point is approximately 30 mass %, that of R 290 approximately 22% and that of HFA 143a approximately 48%. This composition obviously varies as a function of the pressure of the mixture.

Furthermore, in the case of mass fractions of HFA 143a of between 35 and 59%, of R 290 of between 12 and 31% and of HFA 218 of between 10 and 53%, the mixtures exhibit a pseudoazeotropic behaviour.

Because of their low boiling point the mixtures according to the invention can be employed as refrigerant fluids in applications with low boiling temperatures (−40° C.; −50° C.) as in the case of low-temperature industrial or commercial refrigeration, A refrigerant mixture which is very particularly preferred is the azeotrope described above.

Bearing in mind their physical properties which are close to those of the CFCs, the mixtures according to the invention can also be employed as aerosol propellants or as blowing agents for plastic foams.

EXAMPLES

The following examples illustrate the invention without limiting it.

EXAMPLE 1

The HFA 143a/R 290/HFA 218 azeotrope has been demonstrated experimentally by measuring the boiling temperature at 1.013 bar of various mixtures of HFA 143a, R 290 and HFA 218.

The pressures were measured with an accuracy better than 0.005 bar by means of a Heise manometer. The temperatures were adjusted in 0.1° C. steps in order to reach a pressure of 1.013 bar.

The normal boiling points thus determined for various HFA 143a, R 290 and HFA 218 compositions are shown in the following table:

TABLE 1

| MIXTURE COMPOSITION (mass %) | | | BOILING TEMPERATURE AT |
|---|---|---|---|
| HFA 143a | R 290 | HFA 218 | 1.013 BAR (°C.) |
| 100 | 0 | 0 | −47.3 |
| 70.6 | 29.4 | 0 | −53.4 |
| 39.05 | 30.35 | 30.6 | −54.6 |
| 35.9 | 19.8 | 44.3 | −54.6 |
| 46.7 | 22.6 | 30.7 | −54.7 |
| 44.7 | 19.0 | 36.3 | −54.7 |
| 56 | 19.4 | 24.6 | −54.7 |
| 63.9 | 20.8 | 15.3 | −54.3 |
| 50.5 | 13.4 | 36.1 | −54.6 |
| 61.3 | 9.65 | 29.05 | −53.8 |
| 40.7 | 9.35 | 49.95 | −54.3 |

A graphical version (ternary diagram) of the results in this table shows a minimum in the normal boiling point in the case of a mass fraction of HFA 143a of approximately 44–56.5%; of R 290 of approximately 18.5–23% and of HFA 218 of approximately 20.5–37.5%.

Furthermore, it is noted that, in the case of mass fractions of HFA 143a of 35 to 59%, of R 290 of 12 to 31% and of HFA 218 of 10 to 53%, the mixture behaves as a quasi-azeotrope.

Table 2 which follows gives the pressure/temperature relationship for a mixture containing, on a mass basis, 47.4% of HFA 143a, 22.3% of R 290 and 30.3% of HFA 218, compared with that of the pure substances.

TABLE 2

| | ABSOLUTE PRESSURE (BAR) | | | |
|---|---|---|---|---|
| TEMPER-ATURE (°C.) | HFA 143a/ HFA 218/ R 290 mixture | Pure HFA 143a | Pure HFA 218 | Pure R 290 |
| −40 | 1.94 | 1.42 | 0.87 | 1.08 |
| −20 | 4.10 | 3.17 | 2.04 | 2.41 |
| 0 | 7.72 | 6.21 | 4.16 | 4.72 |
| +20 | 13.29 | 11.04 | 7.67 | 8.40 |
| +40 | 21.31 | 18.27 | 12.98 | 13.82 |

The vapour pressure of the azeotrope remains higher than the vapor pressure of the pure substances over a wide temperature range. These data show that the mixture remains azeotropic throughout this temperature interval.

EXAMPLE 2

This example illustrates the use of the mixtures according to the invention as refrigerant fluids.

The thermodynamic performance of various mixtures according to the invention was compared with the performance of the three constituents by themselves and with that of CFC 502 (azeotropic mixture containing, on a mass basis, 48.8% of chlorodifluoromethane and 51.2% of chloropentafluoroethane), under conditions close to those encountered in commercial refrigeration systems, namely the following:

| | |
|---|---|
| condensation temperature: | +30° C. |
| evaporation temperature: | −40° C. |
| liquid supercooling: | −10° C. |
| vapor superheating at the compressor suction: | +30° C. |

Table 3 summarizes the thermodynamic performance observed under these conditions in the case of pure HFA 143a, pure R 290, pure HFA 218, seven mixtures according to the invention and CFC 502.

TABLE 3

| HFA 143a/R 290/ HFA 218 composition (mass %) | COP (*) | Volumetric refrigerant capacity (*) | Compression ratio | Delivery T (°C.) |
|---|---|---|---|---|
| 0/100/0 | 1.031 | 0.88 | 9.9 | 74 |
| 0/0/100 | 0.917 | 0.60 | 11.7 | 39 |
| 100/0/0 | 0.976 | 1.06 | 10.4 | 74 |
| 48/22/30 | 0.945 | 1.26 | 8.8 | 64 |
| 57/19/24 | 0.945 | 1.26 | 9.0 | 66 |
| 45/19/36 | 0.937 | 1.24 | 8.9 | 62 |
| 55/15/30 | 0.933 | 1.22 | 9.1 | 64 |
| 60/10/30 | 0.925 | 1.18 | 9.5 | 65 |
| 65/5/30 | 0.925 | 1.12 | 9.8 | 65 |
| 25/34/41 | 0.915 | 1.10 | 9.6 | 65 |
| CFC 502 | 1 | 1 | 10.2 | 73 |

(*) relative to CFC 502

It can be seen than the mixtures according to the invention offer a number of advantages over pure HFA 143a, pure R 290 pure HFA 218 and CFC 502, namely:

a lower compression ratio, improving the volumetric efficiency of the compressor and consequently resulting in lower plant operating costs;

a temperature at the compressor exit which is approximately 10° C. lower in relation to CFC 502 or HFA 143a, which promotes good stability of the mixture in a refrigeration circuit;

a considerably higher available volumetric refrigerant power which, in practice, at a given refrigerant power, permits the use of a smaller compressor than that specified for employing pure HFA 143a or CFC 502.

This increase in available volumetric refrigerant power in the case of the azeotrope according to the invention also makes it possible to increase by 26% the available refrigerant power of an already existing plant designed for CFC 502.

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims.

We claim:

1. Mixture consisting essentially of, on a mass basis, about 35 to 59% of 1,1,1-trifluoroethane, about 10 to 53% of perfluoropropane and about 12 to 31% of propane, said mixture having a minimum boiling point of about −54.7° C. at 1.013 bar.

2. Mixture consisting essentially of, on a mass basis, about 48% of 1,1,1-trifluoroethane, 30% of perfluoropropane and 22% of propane, said mixture being an azeotropic mixture with a minimum boiling point of about −54.7° C. at 1.013 bar.

3. Method of refrigeration comprising compressing the mixture according to claim 1, whereby refrigeration temperatures are obtained.

4. Method of propelling an aerosol composition comprising the step of propelling a composition with the mixture of claim 1 as the aerosol propellant.

5. Method of making plastic foams comprising the step of blowing plastic with the mixture of claim 1 as the blowing agent.

* * * * *